(12) United States Patent
Sahlin et al.

(10) Patent No.: US 9,413,562 B2
(45) Date of Patent: Aug. 9, 2016

(54) RECEIVING NODE AND METHOD FOR DETERMINING CHANNEL ESTIMATE

(71) Applicant: Telefonaktiebolaget L M Ericsson (publ), Stockholm (SE)

(72) Inventors: Henrik Sahlin, Mölnlycke (SE); Anders Persson, Kode (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/615,695

(22) Filed: Feb. 6, 2015

(65) Prior Publication Data

US 2015/0156037 A1  Jun. 4, 2015

Related U.S. Application Data

(63) Continuation of application No. 13/979,675, filed as application No. PCT/SE2011/050061 on Jan. 20, 2011, now abandoned.

(51) Int. Cl.
*H04B 1/10* (2006.01)
*H04L 25/02* (2006.01)
(Continued)

(52) U.S. Cl.
CPC ............ *H04L 25/022* (2013.01); *H04L 1/0036* (2013.01); *H04L 25/023* (2013.01); *H04L 25/0204* (2013.01); *H04L 25/0232* (2013.01); *H04L 27/2647* (2013.01)

(58) Field of Classification Search
CPC ..................................................... H04L 25/022
USPC ......................................................... 375/349
See application file for complete search history.

(56) References Cited

U.S. PATENT DOCUMENTS

| 6,611,560 B1* | 8/2003 | Kresch et al. ............ 375/240.16 |
| 2004/0165524 A1* | 8/2004 | Chen et al. .................... 370/208 |
| 2010/0197264 A1* | 8/2010 | Azadet et al. ................. 455/272 |

FOREIGN PATENT DOCUMENTS

| WO | 2008118514 A2 | 10/2008 |
| WO | 2008140368 A1 | 11/2008 |

(Continued)

OTHER PUBLICATIONS

Ozdemir, Mehmet K. et al., "Channel Estimation for Wireless OFDM Systems", IEEE Communications Surveys, The Electronic Magazine of Original Peer-Reviewed Survey Articles, vol. 9, No. 2, 2nd Quarter 2007, 1-32.

(Continued)

*Primary Examiner* — Lihong Yu
(74) *Attorney, Agent, or Firm* — Murphy, Bilak & Homiller, PLLC

(57) ABSTRACT

The teachings herein disclose a receiving node and a related method for determining a channel estimate of a radio channel in a receiving node of a radio communication system. The method comprises calculating a matched filter channel estimate based on a known reference signal and a received reference signal in a frequency domain, transforming the matched filter channel estimate into an over-sampled transform domain channel estimate, applying a window to the over-sampled transform domain channel estimate to achieve a windowed transform domain channel estimate, transforming the windowed transform domain channel estimate into a frequency domain channel estimate, and compensating for a bias in the over-sampled frequency domain channel estimate based on a digital sinc function.

19 Claims, 14 Drawing Sheets

(51) Int. Cl.
*H04L 27/26* (2006.01)
*H04L 1/00* (2006.01)

(56) References Cited

FOREIGN PATENT DOCUMENTS

WO  2010088577 A1  8/2010
WO  2012055065 A1  5/2012

OTHER PUBLICATIONS

Unknown, Author, 3GPP TS 36.211, V9.1.0 (Mar. 2010), 3rd Generation Partnership Project; Technical Specification Group Radio Access Network; Evolved Universal Terrestrial Radio Access (E-UTRA); Physical Channels and Modulation (Release 9), Mar. 2010, 1-85.

Van De Beek, Jan-Jaap et al., "On Channel Estimation in OFDM Systems", 1995 IEEE 45th Vehicular Technology Conference, vol. 2, Chicago, IL, USA, Jul. 25-28, 1995, 1-5.

Yang, Baoguo et al., "Windowed DFT Based Pilot-Symbol-Aided Channel Estimation for OFDM Systems in Multipath Fading Channels", 2000 IEEE 51st Vehicular Technology Conference, vol. 2, Tokyo, JP, May 15-18, 2000, 1480-1484.

Yeh, Yenohui et al., "Efficient Channel Estimation Based on Discrete Cosine Transform", 2003 IEEE International Conference on Acoustics, Speech, and Signal Processing, vol. 4, Apr. 6-10, 2003, 676-679.

\* cited by examiner

RECEIVING NODE AND METHOD FOR DETERMINING CHANNEL ESTIMATE

RELATED APPLICATIONS

This application claim priority under 35 U.S.C. 120 as a continuation of U.S. application Ser. No. 13/979,675, filed on 15 Jul. 2013, which application is a national-stage filing under 35 U.S.C. 371 of PCT Application No. PCT/SE2011/050061, filed on 20 Jan. 2011.

TECHNICAL FIELD

The present disclosure relates to channel estimation, and more particularly to a receiving node and a method for determining a channel estimate of a radio channel in a receiving node of a radio communication system, as well as to a computer program and a computer program product.

BACKGROUND

The Universal Mobile Telecommunication System (UMTS) is one of the third generation mobile communication technologies designed to succeed the Global System for Mobile communication (GSM). 3GPP Long Term Evolution (LTE) is a project within the $3^{rd}$ Generation Partnership Project (3GPP) to improve the UMTS standard to cope with future requirements in terms of improved services such as higher data rates, improved efficiency, and lowered costs. The Universal Terrestrial Radio Access Network (UTRAN) is the radio access network of a UMTS and Evolved UTRAN (E-UTRAN) is the radio access network of an LTE system. In an E-UTRAN, a user equipment (UE) 150 is wirelessly connected to a radio base station (RBS) 110a commonly referred to as an eNodeB (eNB), as illustrated in FIG. 1. The eNBs 110a-c are directly connected to the core network (CN) 190.

In a wireless communication system using Orthogonal Frequency Division Multiplexing (OFDM) technology, the entire channel is divided into many narrow sub-channels, which are transmitted in parallel. This technique thus transforms a frequency selective wide-band channel into a group of non-selective narrowband channels, making it robust against large delay spread by preserving the orthogonality in the frequency domain. The primary advantage of OFDM over single-carrier schemes is its ability to cope with severe channel conditions without complex equalization filters in the receiver. Channel equalization is simplified because OFDM may be viewed as using many slowly-modulated narrowband signals rather than one rapidly-modulated wideband signal. The low symbol rate makes the use of a guard interval between symbols affordable, making it possible to handle time-spreading and eliminate inter-symbol interference.

In an LTE system the OFDM technology is adopted as a mean to achieve high transmission capability and robustness to multi-path delay. Orthogonal Frequency Division Multiple Access (OFDMA) is used in the downlink, and Single-carrier Frequency Division Multiple Access (SC-FDMA) is used in the uplink. OFDMA is a multi-user version of OFDM, where multiple access is achieved by assigning subsets of sub-carriers to individual users. SC-FDMA is a linearly pre-coded OFDM scheme. The distinguishing feature of SC-FDMA is that it leads to a single-carrier transmit signal, in contrast to OFDMA which is a multi-carrier transmission scheme. Furthermore, SC-FDMA has a lower peak-to-average power ratio which entails improved transmitter power efficiency for the battery-operated UE.

In LTE downlink, the physical layer is thus based on OFDMA. The transmitter structure for LTE downlink is illustrated in FIG. 2b. The information to be transmitted is coded e.g. by a turbo coding, interleaved, scrambled, and modulated to symbols. Some examples of modulation schemes are the Phase Shift Keying (PSK) modulations such as Quaternary or Quadrature PSK (QPSK), and the combinations of PSK and Amplitude Shift Keying (ASK) modulations such as 16 Quadrature Amplitude Modulation (QAM) and 64QAM. The symbols are fed to an Inverse Fast Fourier Transform (IFFT), where these symbols are mapped to a specified frequency interval specified as a number of sub-carriers. A resource block consists of 12 sub-carriers and is the smallest amount that a UE can be allocated. The IFFT is used to transform the symbols to be transmitted from a frequency domain representation to a time domain representation.

In LTE uplink, the physical layer is based on SC-FDMA, which is also referred to as pre-coded OFDM. This means that the physical channels are built of SC-FDMA symbols. The transmitter structure for LTE uplink is illustrated in FIG. 2c. The modulated symbols are transformed to the frequency domain by a Discrete Fourier Transform (DFT) of the same size as the number of modulated symbols of each SC-FDMA symbol. This is then fed to a larger IFFT with a size which depends on the bandwidth of the radio communication link.

In both downlink and uplink, a Cyclic Prefix (CP) is inserted at the output of the transmitter IFFT. The CP insertion implies that the last samples of the IFFT output block is copied and inserted at the beginning of the block. At the receiver side, the corresponding CP samples are discarded before demodulation by means of DFT processing, which means that support for calculating e.g. Fast Fourier Transforms (FFTs) is needed. An FFT is an efficient algorithm to compute the DFT and correspondingly the IFFT is used to compute the Inverse DFT (IDFT).

A radio communication between a UE and an RBS will be affected by multi-path propagation, fading, frequency errors, round trip times etc. This communication channel is often referred to as an air interface, and causes bit and block errors on information transmitted. A receiver is designed in order to reduce bit error and block error rates, and comprises e.g. FFTs, an equalizer and an antenna combining unit, as illustrated in FIG. 4. Another essential part of this receiver structure is the channel estimator.

Channel estimation has been widely used to improve the performance of OFDM systems. An accurate channel estimate is crucial for the equalization and thus also for demodulation and decoding of the user data. Pilot based channel estimation schemes are commonly used. In such a scheme known reference symbols—also called pilot symbols—are inserted at regular intervals in the time-frequency grid. Using the knowledge of the pilot symbols, the receiver can estimate the frequency domain channel around the location of the pilot symbol. As illustrated in FIG. 2a, the reference signals 230 are transmitted on the first, fifth, eight and twelfth symbol and occupy each sixth sub-carrier for LTE downlink and single stream transmission, while user data 220 is transmitted on the other sub-carriers. Each symbol is preceded by a CP 210 as described above. When multiple streams are utilized such as for Multiple Input Multiple Output (MIMO), more symbols are allocated to reference signals.

In FIG. 2d, the sub-frame format for LTE uplink is illustrated in which twelve symbols are allocated to user data 220, and two symbols are allocated to demodulation reference signals 230, for each sub-frame of one millisecond. Each symbol is preceded by a CP 210 as described above. The reference signals have the same resolution in frequency domain as the user data, as the same number of sub-carriers is allocated for reference signal symbols 230 as for user data symbols 220.

In a system where Multi-User MIMO (MU-MIMO) is used, several UEs may be scheduled to transmit simultaneously during the same time and frequency intervals, as illustrated in FIG. 3. These UEs can be distinguished by allocating different, and preferably orthogonal, reference signals to the different UEs, such that all channels from all transmit antennas to all receive antennas can be estimated. In MU-MIMO for LTE, the reference signals of the different UEs are based on different cyclic shifts of one basic reference signal.

The channel's frequency response across the whole bandwidth can thus be determined by interpolation using various channel estimation schemes. Several channel estimation algorithms are proposed based on DFTs or Discrete Cosine Transforms (DCTs). With DFT and DCT based channel estimation, the frequency domain channel estimate is transformed into a time or transform domain channel estimate and the time or transform domain properties of the channel are used instead of the frequency domain properties when estimating the channel.

An example of a known channel estimation algorithm based on DFT is described with reference to FIG. 4. In a first step, a matched filter channel estimate is calculated. The matched filter channel estimate $\hat{H}_{MF}(k)$ may be determined as:

$$\hat{H}_{MF}(k) = X^*(k)Y(k) \qquad (1)$$

where k is the sub-carrier index, Y(k) is a received reference signal in the frequency domain and X*(k) is a complex conjugate of known demodulation reference signals. In a second step, this matched filter channel estimate is converted to the time domain by an IDFT. A time domain representation of this matched filter channel estimate $\hat{h}_{MF}(m)$ is determined as:

$$\hat{h}_{MF}(m) = \frac{1}{\sqrt{N_c}} \sum_{k=0}^{N_c-1} e^{j\frac{2\pi k m}{N_c}} \hat{H}_{MF}(k) \qquad (2)$$

where m is a channel tap index, k is the sub-carrier index, and $N_c$ is the number of sub-carriers for which reference signals are available. The fundamental period of the IDFT is equal to the number of sub-carriers for which the channel estimate is calculated, and is thus equal to the number of sub-carriers $N_c$ for which reference signals are available.

In a third step, a window is applied to the matched filter time domain channel estimate $\hat{h}_{MF}(m)$ which can be described as keeping the channel taps from a left channel tap index $m=m_L$ to a right channel tap index $m=m_R$. The purpose of the windowing is to reduce the noise, by extracting only the relevant part of the channel in the time domain. Finally, in a fourth step, this windowed channel estimate is converted to the frequency domain with a DFT. The frequency domain channel estimate $\hat{H}_{DFT}(k)$ is then determined as:

$$\hat{H}_{DFT}(k) = \frac{1}{\sqrt{N_c}} \sum_{m=m_L}^{m_R} e^{-j\frac{2\pi k m}{N_c}} \hat{h}_{MF}(m) \qquad (3)$$

For LTE downlink, the reference signals occupy only each sixth sub-carrier as illustrated in FIG. 2a, and the reference signal resolution is thus low. If the channel estimate in the frequency domain is required with a higher resolution than the available one, a zero padding of the time domain channel estimate may be done before performing the DFT. By zero-padding the time domain channel estimate to a length of six times the number of sub-carriers used for reference signals $N_c$, and then convert this extended time domain channel estimate to the frequency domain by a DFT, a channel estimate is achieved with the same frequency resolution as the user data symbols. For LTE uplink, the reference signals have the same resolution in the frequency domain as the user data, such that no time domain zero-padding corresponding to a frequency domain interpolation is needed.

It is also possible to include a zero-padding such that both the IDFT and the DFT are based on a higher fundamental period than the actual number of sub-carriers, in order to reduce the distortion in the band edges. Such a zero-padding is referred to as an over-sampling of the channel with an over-sampling factor $K_{OS}$. In the example illustrated in FIG. 5, a channel of 48 sub-carriers is zero-padded up to double length, i.e. the over-sampling factor $K_{OS}$ is equal to two. A time domain channel estimate based on an over-sampled IDFT $\hat{h}_{osMF}(m)$ is determined as:

$$\hat{h}_{osMF}(m) = \frac{1}{\sqrt{N_c K_{os}}} \sum_{k=0}^{N_c-1} e^{j\frac{2\pi k m}{N_c K_{os}}} \hat{H}_{MF}(k) \qquad (4)$$

With a rectangular window applied to this over-sampled time domain channel estimate, a windowed frequency domain channel estimate $\hat{H}_{osDFT}(k)$ is determined as:

$$\hat{H}_{osDFT}(k) = \frac{1}{\sqrt{N_c K_{os}}} \sum_{m=m_L}^{m_R} e^{-j\frac{2\pi k m}{N_c K_{os}}} \hat{h}_{osMF}(m) \qquad (5)$$

The applied rectangular window may be adaptive in the sense that both the left index $m_L$ and the right index $m_R$ are adjusted with a so called Akaike approach, in order to adaptively cover all main channel taps within the window. FIG. 5 illustrates the window applied in the frequency domain, which is thus a frequency domain interpretation of the rectangular time domain window.

In a DCT based channel estimation, the IDFT in the second step of FIG. 4 is replaced by a DCT, and the transform domain representation of the matched filter channel estimate $\hat{h}_{DCT}(m)$ is given by:

$$\hat{h}_{DCT}(m) = w_m \sum_{k=0}^{N_c-1} \hat{H}_{MF}(k) \cos\left(\frac{\pi(2k+1)m}{2N_c}\right) \qquad (6)$$

where $w_0 = \sqrt{1/N_c}$ and $w_m = \sqrt{2/N_c}$ for $1 \leq m \leq N_c - 1$. Moreover, the DFT in the fourth step of FIG. 4 is replaced by an IDCT.

A DCT may be described as a mirror extension of the spectrum to double length followed by an IDFT, as illustrated in FIGS. 6a-b. This means that a DCT can be calculated by a data manipulation—i.e. the mirror extension—followed by an IDFT, where the IDFT has a fundamental period equal to twice the number of sub-carriers. FIG. 6a illustrates the magnitude response for the DCT, and FIG. 6b illustrates the phase response for the DCT.

When applying a window to a transform domain channel estimate, a bias of the channel estimate occurs especially in the frequency edges, thus resulting in an inaccurate channel estimation which may negatively affect e.g. the equalization of user data in the receiver. This is true both when using an over-sampled DFT based channel estimation and a DCT based channel estimation.

SUMMARY

An object is therefore to address the problems and disadvantages outlined above, and to determine a channel estimate where windowing is used to reduce the noise, while limiting the bias problem introduced by the windowing.

This object and others are achieved by the method and node according to the independent claims, and by the embodiments according to the dependent claims.

In accordance with one embodiment, a method for determining a channel estimate of a radio channel in a receiving node of a radio communication system is provided. The method comprises calculating a matched filter channel estimate based on a known reference signal and a received reference signal in a frequency domain, and transforming the matched filter channel estimate into an over-sampled transform domain channel estimate. The method also comprises applying a window to the over-sampled transform domain channel estimate to achieve a windowed transform domain channel estimate, transforming the windowed transform domain channel estimate into a frequency domain channel estimate, and compensating for a bias in the over-sampled frequency domain channel estimate based on a digital sinc function.

In accordance with another embodiment, a receiving node for a radio communication system comprising a channel estimator configured to determine a channel estimate of a radio channel is provided. The channel estimator comprises a calculating circuit adapted to calculate a matched filter channel estimate based on a known reference signal and a received reference signal in a frequency domain, a first transforming circuit adapted to transform the matched filter channel estimate into an over-sampled transform domain channel estimate, and a windowing circuit adapted to apply a window to the over-sampled transform domain channel estimate to achieve a windowed transform domain channel estimate. The channel estimator further comprises a second transforming circuit adapted to transform the windowed transform domain channel estimate into a frequency domain channel estimate, and a compensating circuit adapted to compensate for a bias in the over-sampled frequency domain channel estimate based on a digital sinc function.

An advantage of particular embodiments is that the accuracy of traditional DFT or DCT based channel estimations using windowing for reducing noise is improved.

DETAILED DESCRIPTION

Figure 1:
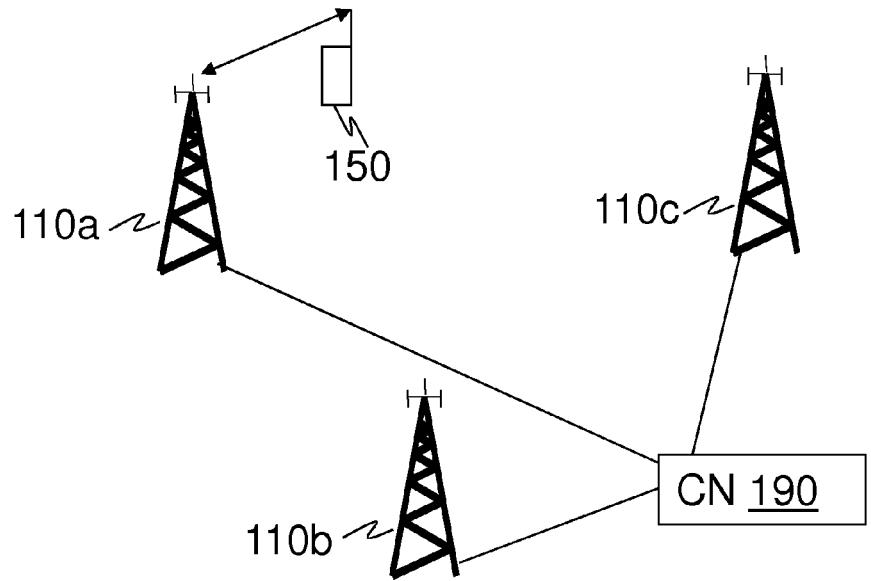
FIG. 1 is a schematic block diagram illustrating a conventional wireless communication system.
Figure 2A:
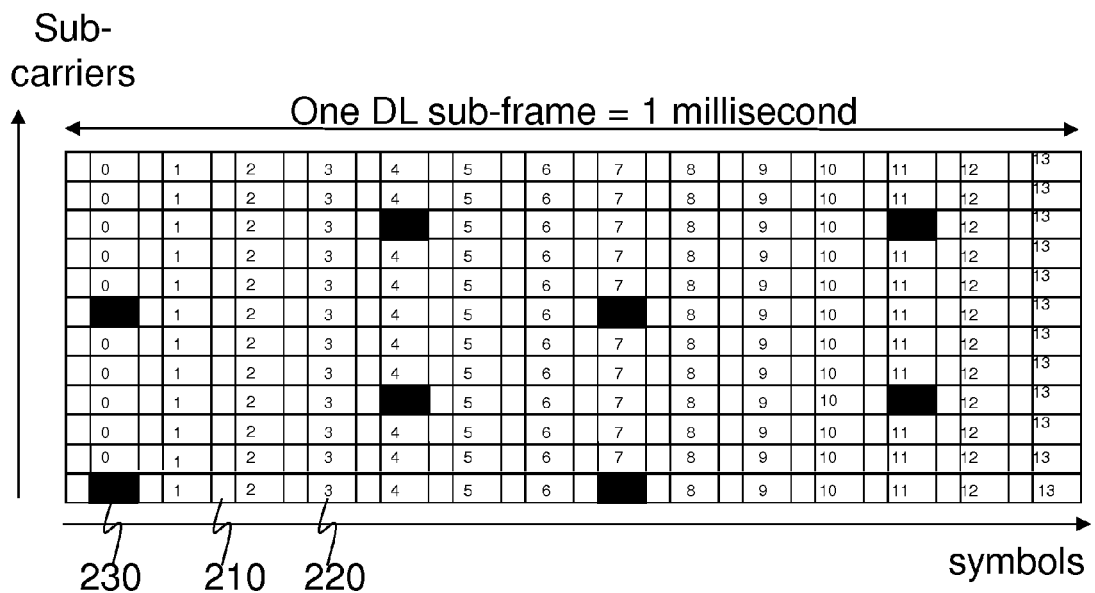
FIGS. 2a and 2d illustrate the sub-frame structure for LTE downlink and uplink respectively.
Figure 2B:
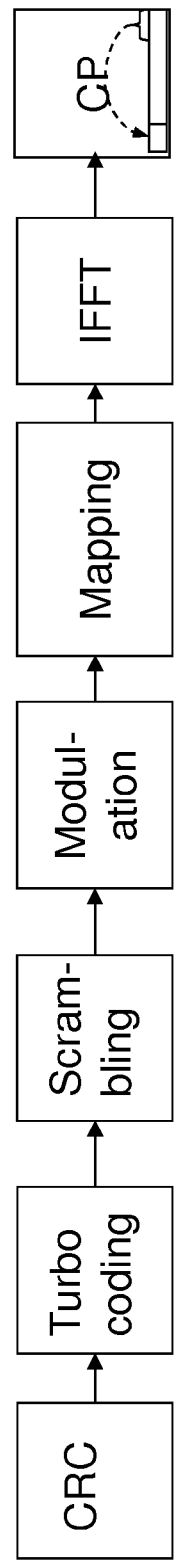
FIGS. 2b and 2c are schematic block diagrams illustrating the transmitter structure in LTE downlink and uplink respectively.
Figure 2C:
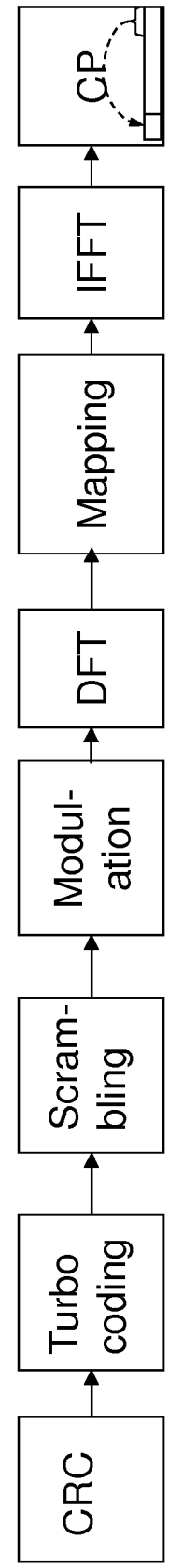
Figure 2D:
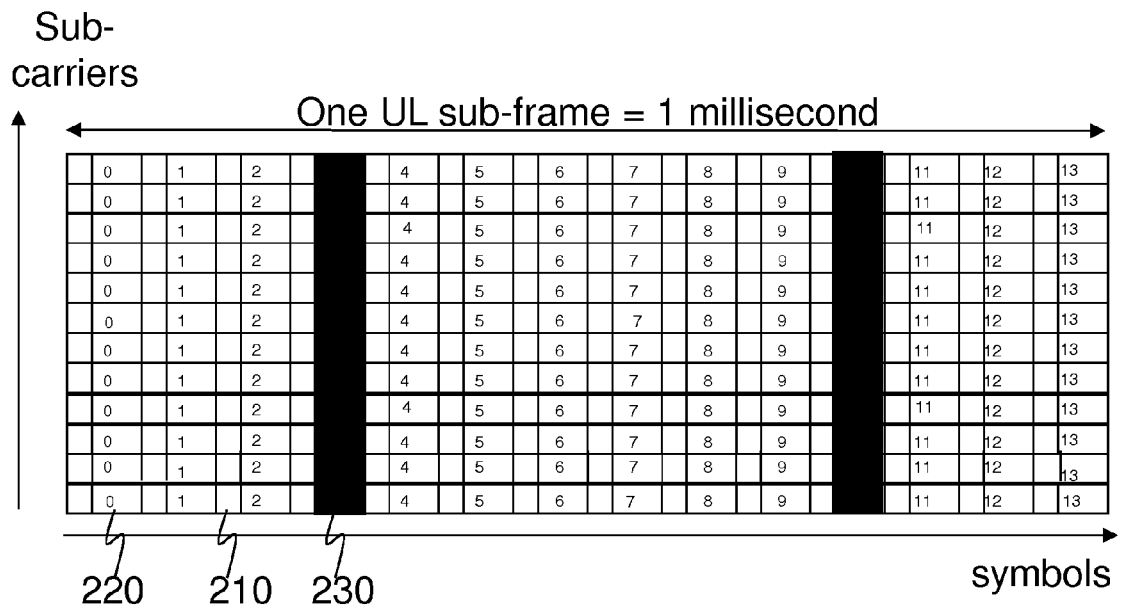
Figure 3:
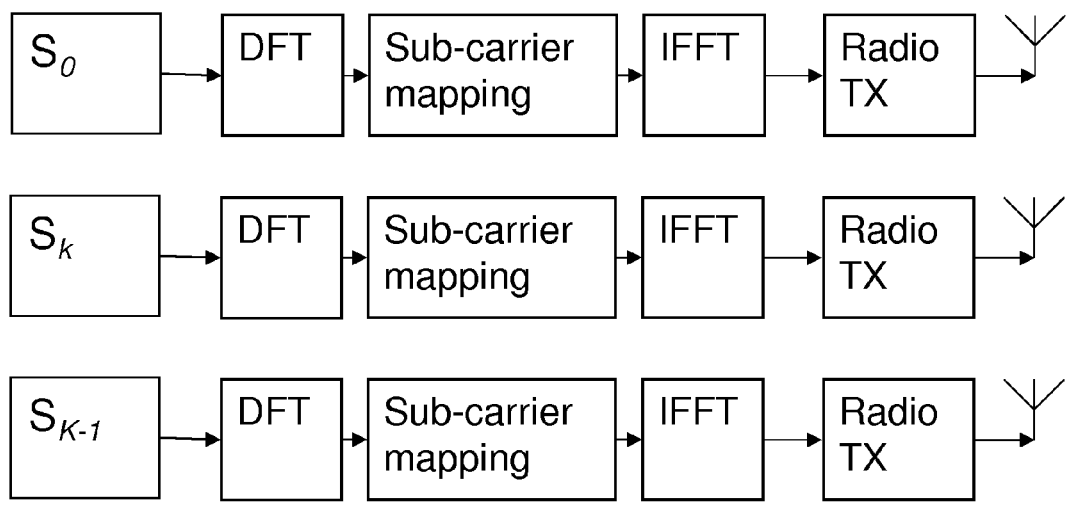
FIG. 3 is a schematic block diagram illustrating transmitters for K numbers of UEs with one antenna each.

In the following, different aspects will be described in more detail with references to certain embodiments and to accompanying drawings. For purposes of explanation and not limitation, specific details are set forth, such as particular scenarios and techniques, in order to provide a thorough understanding of the different embodiments. However, other embodiments that depart from these specific details may also exist.

Moreover, those skilled in the art will appreciate that while the embodiments are primarily described in form of a method and a node, they may also be embodied in a computer program product as well as in a system comprising a computer processor and a memory coupled to the processor, wherein the memory is encoded with one or more programs that may perform the method steps disclosed herein, as described below with reference to FIG. 12b.

Embodiments are described herein by way of reference to particular example scenarios. Particular aspects are described in a non-limiting general context in relation to an LTE system. It should though be noted that the invention and its exemplary embodiments may also be applied to other types of radio access networks using channel estimation.

This disclosure relates to the determination of a channel estimate. With the use of an over-sampled DFT based channel estimation or a DCT based channel estimation, a bias of the channel estimate occurs, especially in the frequency edges. The explanation to why this bias occurs is described in detail hereinafter.

The received signal Y(k) at sub-carrier index k may be modeled as the demodulation reference signal X(k) multiplied with the true channel H(k) plus additive noise and interference, N(k), i.e.

$$Y(k)=X(k)H(k)+N(k) \quad (7)$$

The windowing of a time domain channel estimate based on an over-sampled IDFT has previously been described with reference to equations (4) and (5). Hereinafter, a frequency domain interpretation of the time domain windowing is given. Inserting (4) into (5) results in:

$$\hat{H}_{osDFT}(k) = \frac{1}{N_c K_{os}} \sum_{m=m_L}^{m_R} e^{-j\frac{2\pi km}{N_c K_{os}}} \sum_{k'=0}^{N_c-1} e^{j\frac{2\pi k'm}{N_c K_{os}}} \hat{H}_{MF}(k') \quad (8)$$

$$= \frac{1}{N_c K_{os}} \sum_{k'=0}^{N_c-1} \sum_{m=m_L}^{m_R} e^{-j\frac{2\pi(k-k')m}{N_c K_{os}}} \hat{H}_{MF}(k')$$

Rewriting the innermost summation using the following well known formula:

$$\sum_{n=N_0}^{N_1} e^{-j\frac{2\pi kn}{N}} = \frac{e^{-j\frac{2\pi kN_0}{N}} - e^{-j\frac{2\pi k(N_1+1)}{N}}}{1 - e^{-j\frac{2\pi k}{N}}} \quad (9)$$

gives:

$$\hat{H}_{osDFT}(k) = \frac{1}{N_c K_{os}} \sum_{m=m_L}^{m_R} e^{-j\frac{2\pi km}{N_c K_{os}}} \sum_{k'=0}^{N_c-1} e^{j\frac{2\pi k'm}{N_c K_{os}}} \hat{H}_{MF}(k') \quad (10)$$

$$= \frac{1}{N_c K_{os}} \sum_{k'=0}^{N_c-1} \sum_{m=m_L}^{m_R} -e^{-j\frac{2\pi(k-k')m}{N_c K_{os}}} \hat{H}_{MF}(k')$$

$$= \frac{1}{N_c K_{os}} \sum_{k'=0}^{N_c-1} \frac{e^{-j\frac{2\pi(k-k')m_L}{N_c K_{os}}} - e^{-j\frac{2\pi(k-k')(m_R+1)}{N_c K_{os}}}}{1 - e^{-j\frac{2\pi(k-k')}{N_c K_{os}}}} \hat{H}_{MF}(k')$$

Finally, using $\sin(x)=(e^{jx}-e^{-jx})/(2j)$ results in:

$$\hat{H}_{osDFT}(k) = \frac{1}{N_c K_{os}} \sum_{k'=0}^{N_c-1} \frac{e^{-j\frac{2\pi(k-k')m_L}{N_c K_{os}}} - e^{-j\frac{2\pi(k-k')(m_R+1)}{N_c K_{os}}}}{1 - e^{-j\frac{2\pi(k-k')}{N_c K_{os}}}} \hat{H}_{MF}(k') \quad (11)$$

$$= \frac{1}{N_c K_{os}} \sum_{k'=0}^{N_c-1} \frac{\sin\left(\frac{2\pi(k-k')-(m_R-m_L+1)}{2N_c K_{os}}\right)}{\sin\left(\frac{2\pi(k-k')}{2N_c K_{os}}\right)} e^{-j\frac{2\pi(k-k')(m_R+m_L)}{2N_c K_{os}}} \hat{H}_{MF}(k')$$

which is a frequency domain convolution between the matched filter channel estimate $\hat{H}_{MF}(k)$ and a digital sinc—also called sincd—function. The digital sinc function W(k), also referred to as the frequency domain convolution window is thus defined according to:

$$W(k) = \frac{1}{N_c K_{os}} \frac{\sin\left(\frac{2\pi k(m_R-m_L+1)}{2N_c K_{os}}\right)}{\sin\left(\frac{2\pi k}{2N_c K_{os}}\right)} e^{-j\frac{2\pi k(m_R+m_L)}{2N_c K_{os}}} \quad (12)$$

Figure 7:
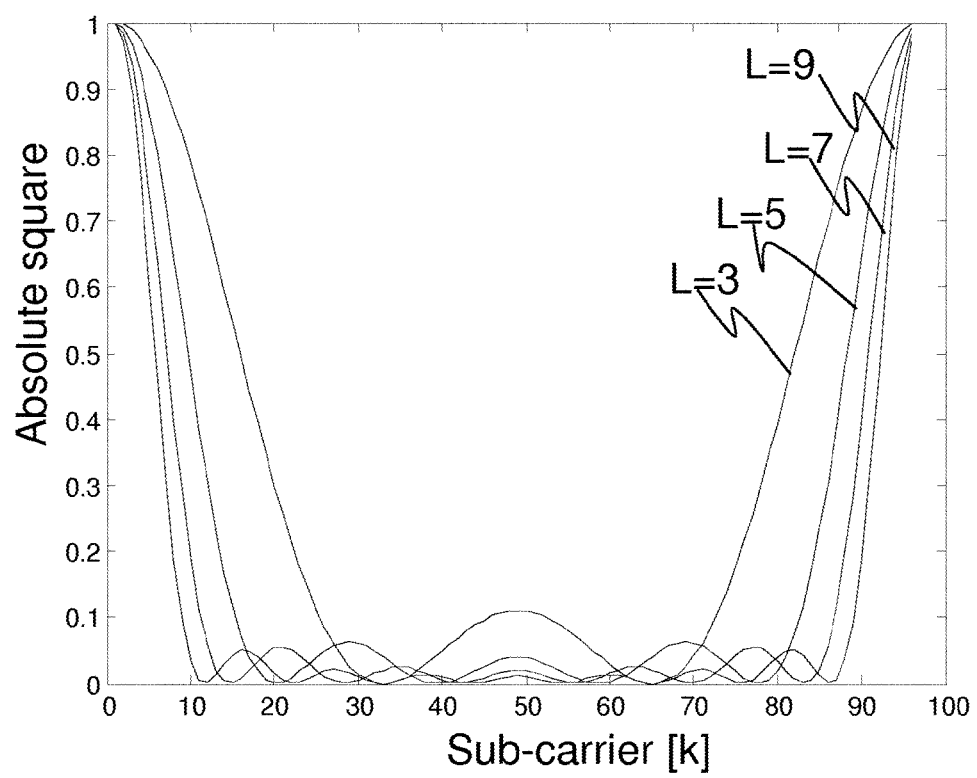
FIG. 7 is a diagram illustrating the digital sinc function for different channel lengths.

The digital sinc function is illustrated in FIG. 7 for a few values of the channel length $L=m_R-m_L+1$ given as a number of channel taps.

Replacing the matched filter channel estimate $\hat{H}_{MF}(k')$ in equation (11) with equation (1) and using the received signal model in equation (7) results in the following equation for describing the channel estimate based on an over-sampled DFT:

$$\hat{H}_{osDFT}(k) = \sum_{k'=0}^{N_c-1} W(k-k')H(k') + \sum_{k'=0}^{N_c-1} W(k-k')\tilde{N}(k') \quad (13)$$

where $$\tilde{N}(k) = X^*(k)N(k) \quad (14)$$

Figure 8A:
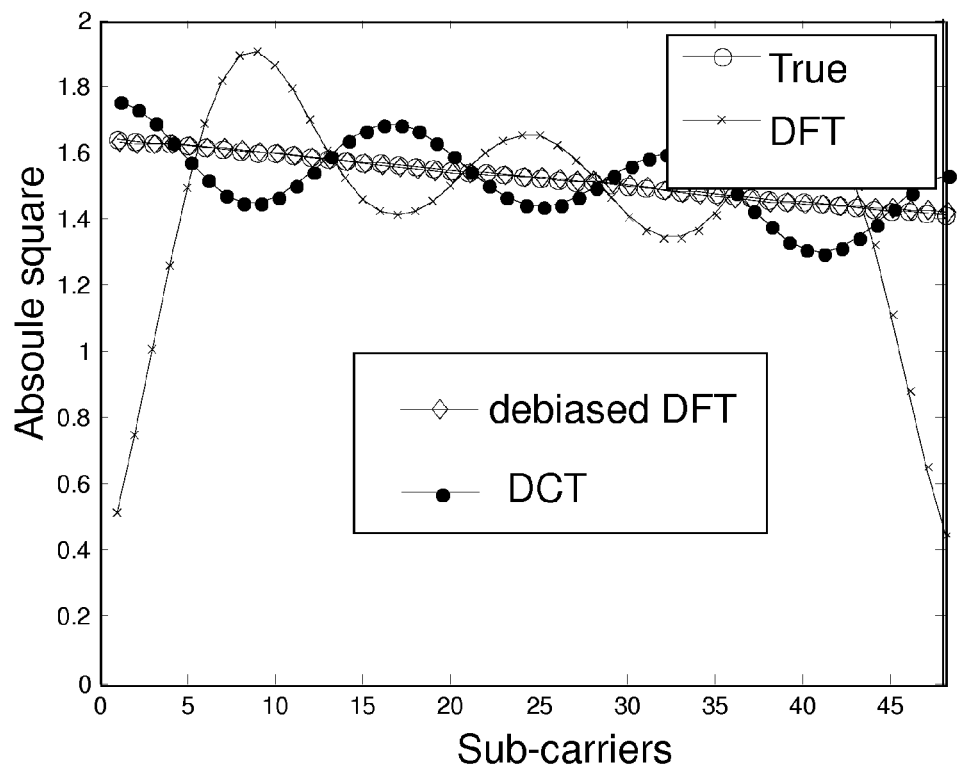
FIGS. 8a-b are diagrams illustrating magnitude and phase response of a true channel, an over-sampled DFT channel estimate, a de-biased over-sampled DFT channel estimate and a DCT channel estimate.
Figure 8B:
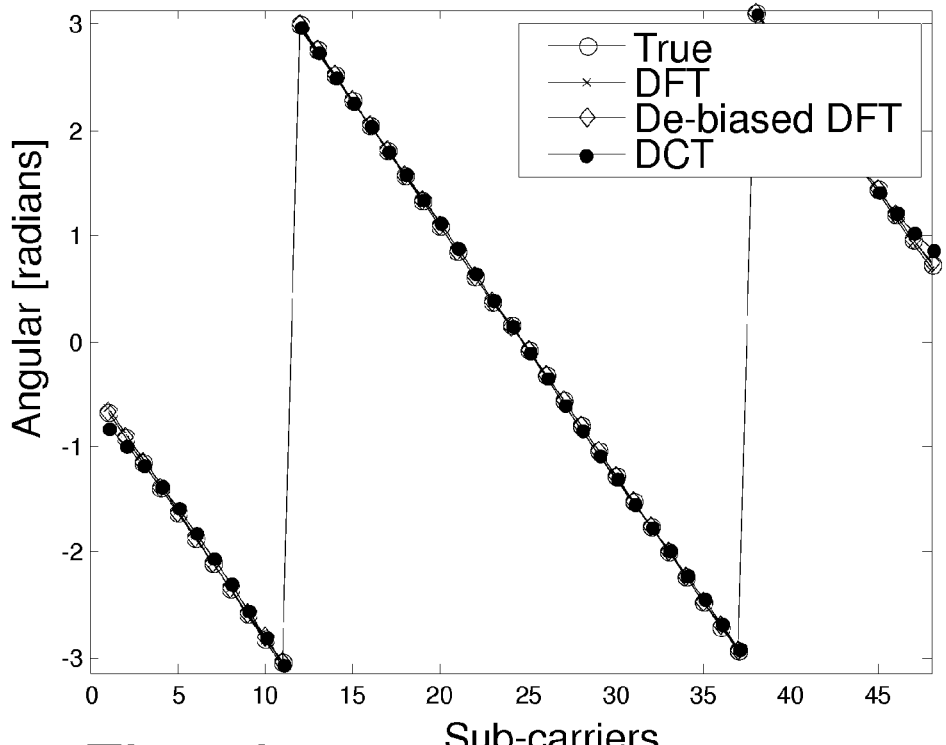

The impact of the convolution of the channel estimate with the sincd function is explained with FIG. 8a, illustrating the magnitude square response with L=5, and with FIG. 8b, illustrating the corresponding angular response. Both an over-sampled DFT based channel estimate and a DCT based channel estimate is illustrated together with a true channel. These figures thus give a good perception of the difference between estimated channels and the true channel, and it may be seen that the channel estimates are biased especially in the frequency band edges. In the example of FIGS. 8a-b, it is illustrated that the DCT based channel estimation results in a channel estimate closer to the true channel than the result from the over-sampled DFT based channel estimation. Furthermore, the de-biased over-sampled DFT based channel estimate corresponding to embodiments of the invention is also illustrated in the FIGS. 8a-b and will be further discussed below.

As already mentioned, the reference signals for LTE uplink can be constructed by cyclic shifts of one base sequence. Different users or layers are then assigned different cyclic shifts. In order to reduce interference between the reference signals corresponding to different MU-MIMO users, the differences in cyclic shifts should be as large as possible.

Figure 9:
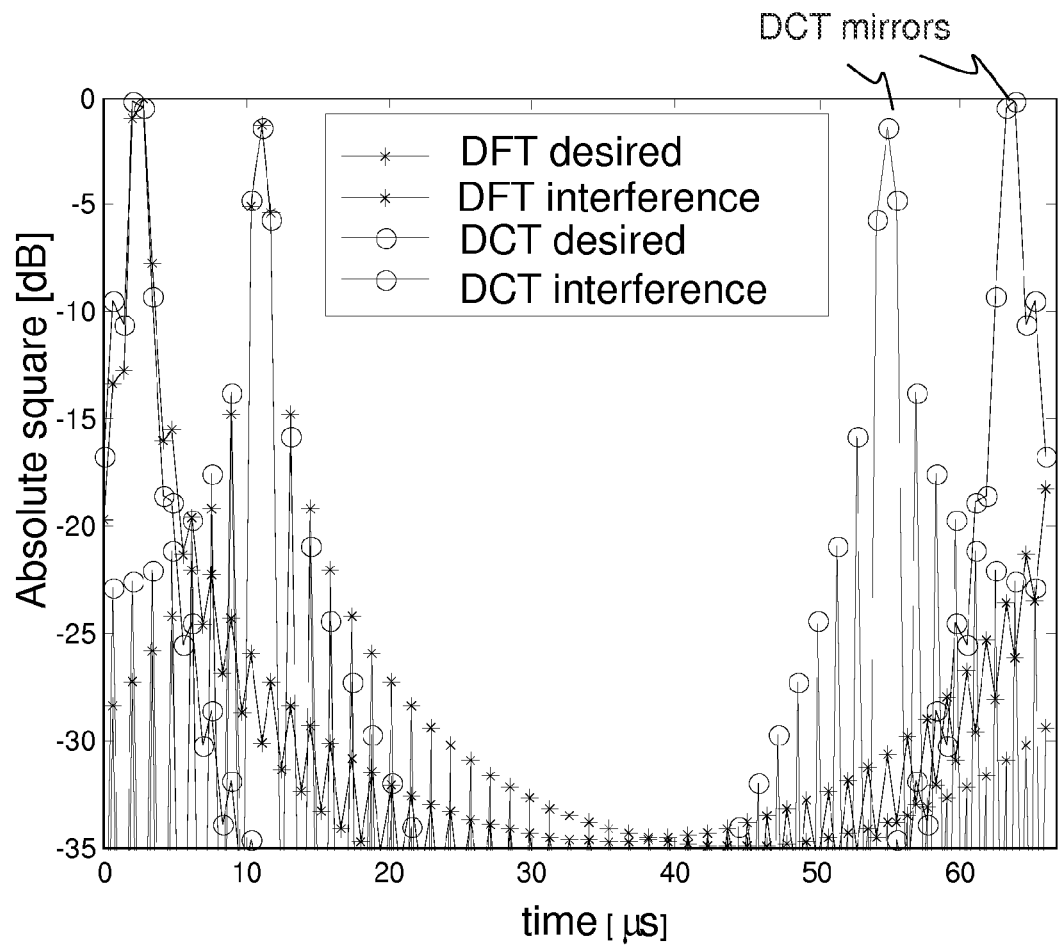
FIG. 9 is a diagram illustrating an over-sampled DFT based channel estimate and a DCT based channel estimate for both a desired user and an interfering cyclic shifted reference signal.

FIG. 9 illustrates an over-sampled DFT based channel estimate and a DCT based channel estimate both for a desired user, denoted DFT and DCT desired, and for an interfering user with a cyclic shifted reference signal, denoted DFT and DCT interference. The length of the horizontal axis corresponds to the length of one OFDM symbol i.e. 66.7 microseconds. In this example, a two tap channel model is used with a group delay of 2.5 microseconds. Both channel estimates result in a peak corresponding to this group delay. However, the DCT also results in a mirror peak at 66.7−2.5=64.2 microseconds. The interfering cyclic shifted reference signal is also illustrated for both the over-sampled DFT based channel estimate and the DCT based channel estimate.

Figure 4:
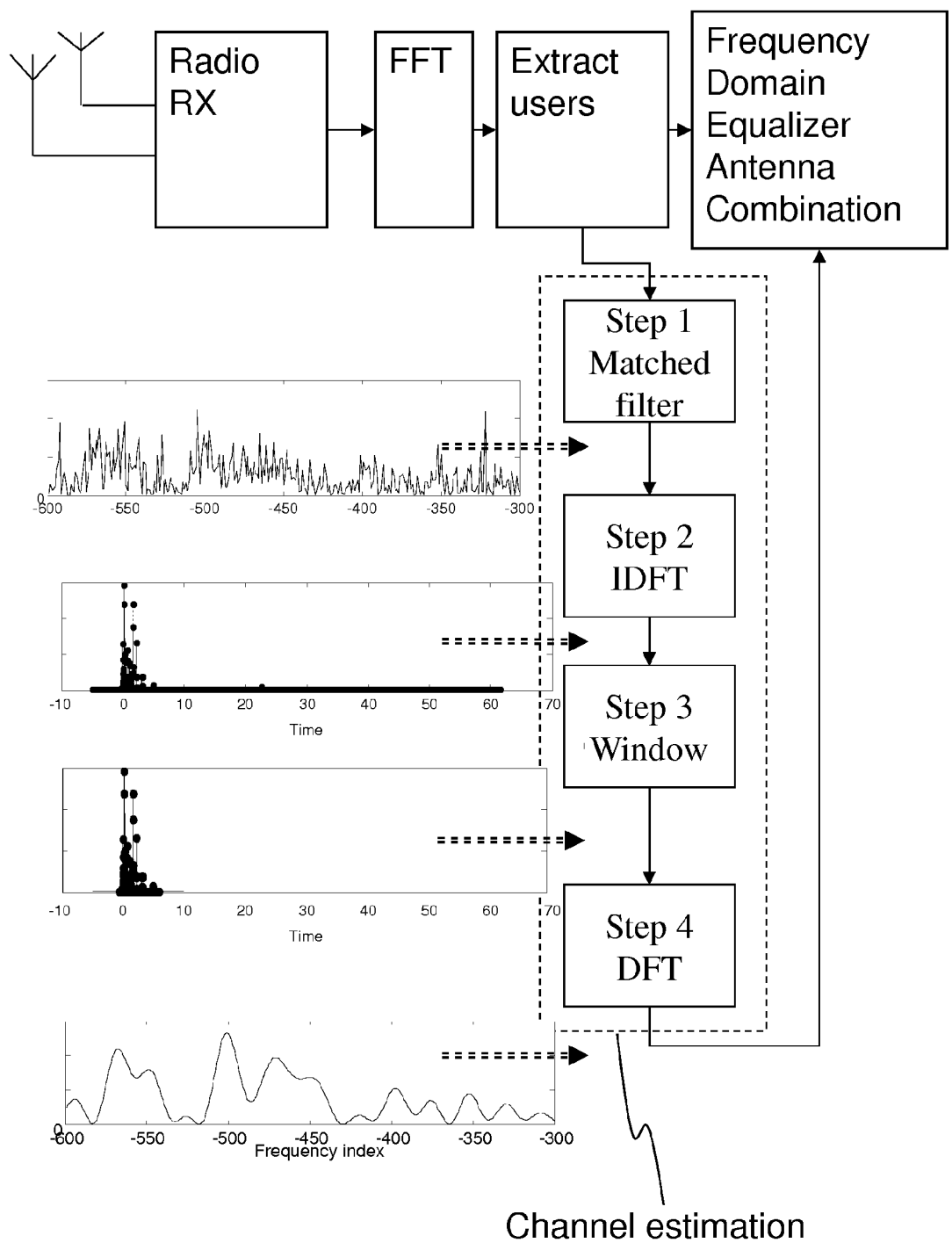
FIG. 4 is a schematic block diagram illustrating a conventional OFDM receiver using a DFT based channel estimation.
Figure 5:
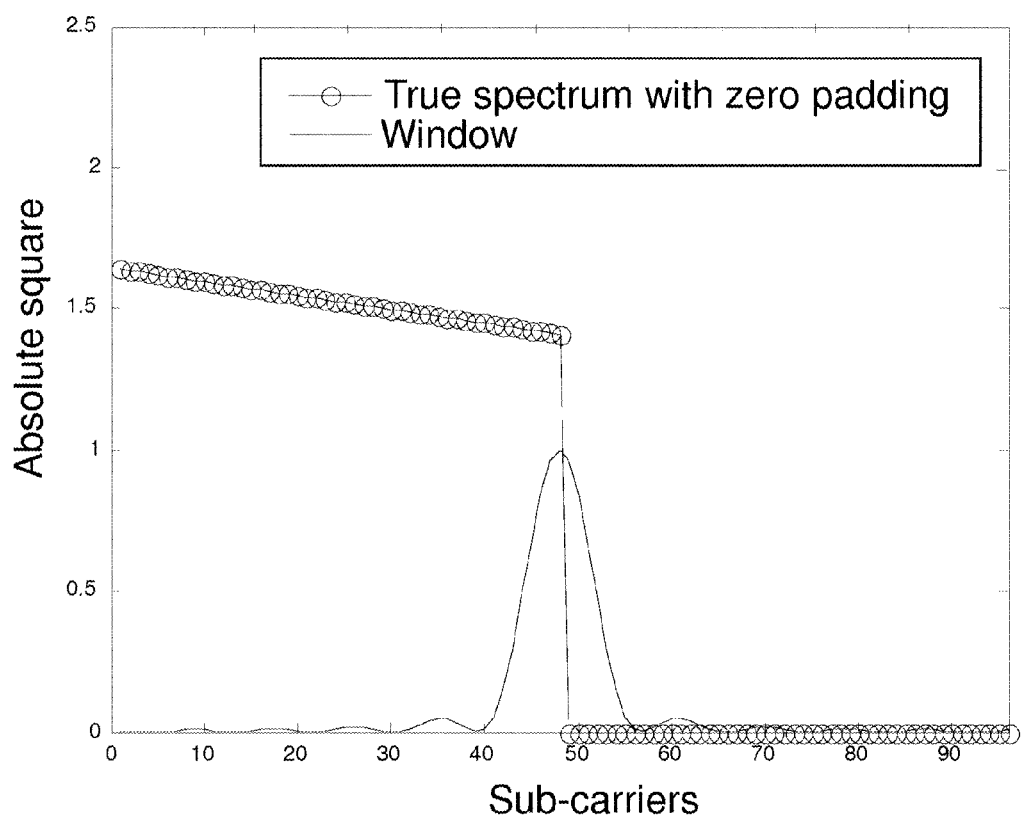
FIG. 5 is a diagram illustrating an example of over-sampling with a factor two.
Figure 6A:
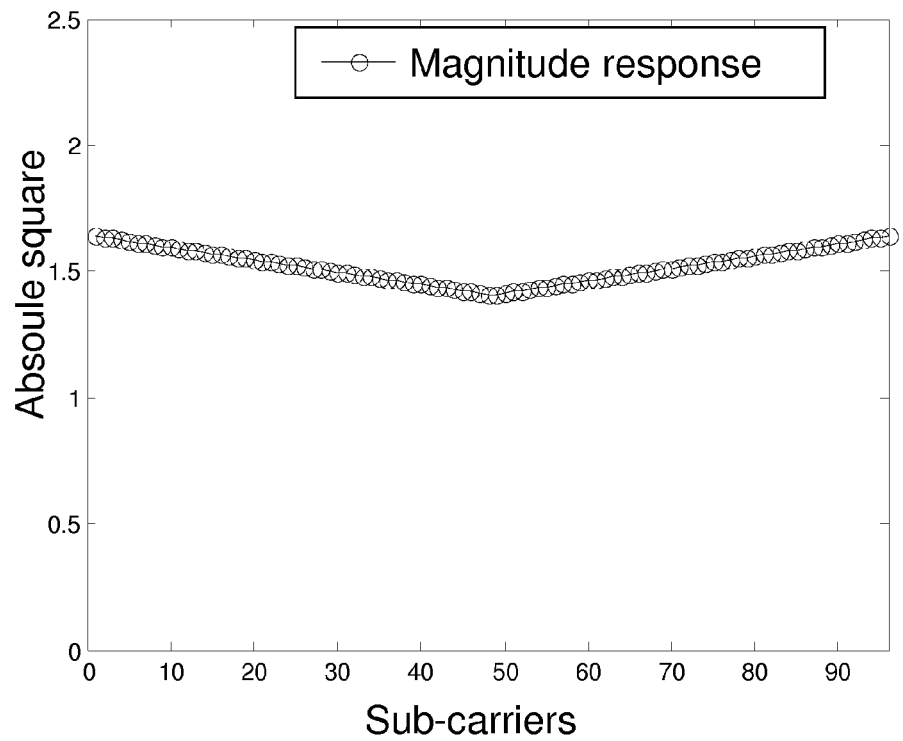
FIGS. 6a-b are diagrams illustrating magnitude and phase response for a DCT.
Figure 6B:
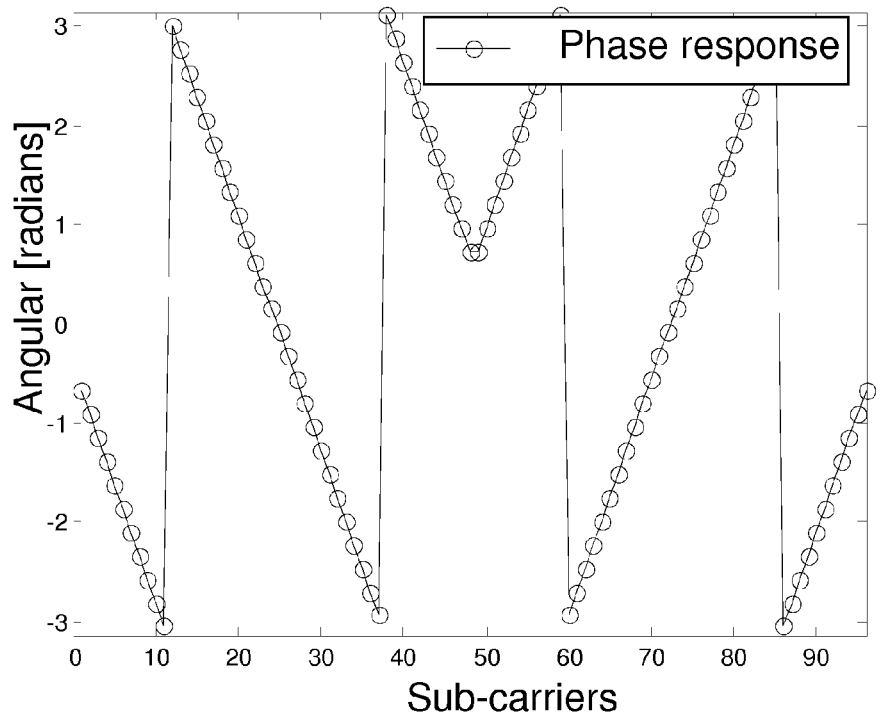
Figure 10A:
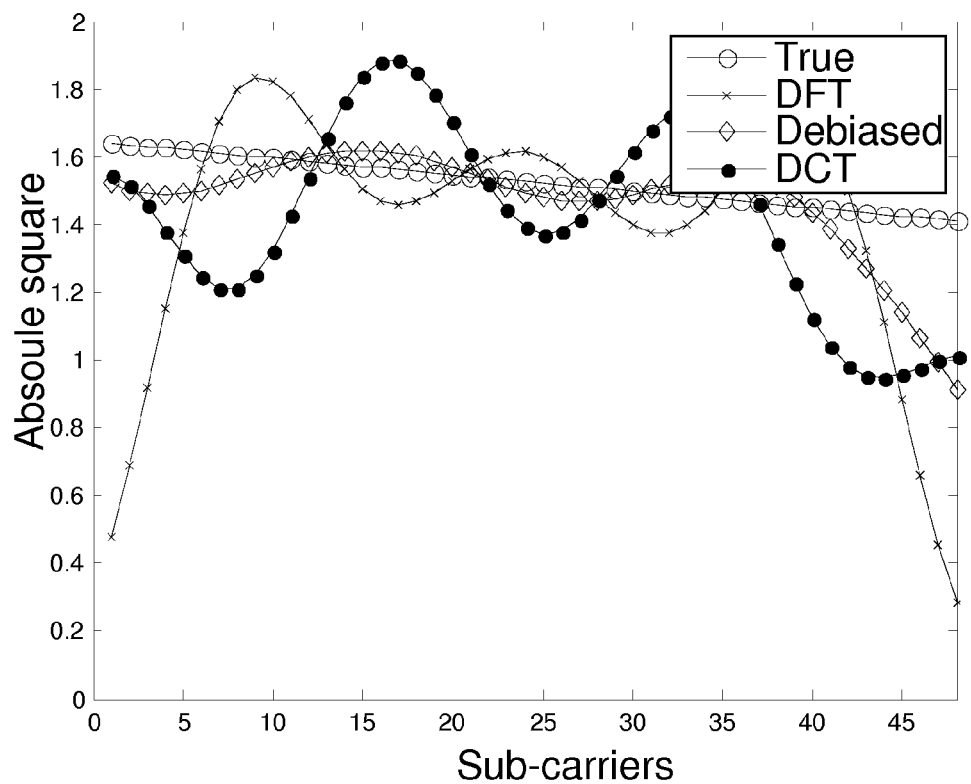
FIGS. 10a-b are diagrams illustrating magnitude and phase response of a true channel, an over-sampled DFT channel estimate, a de-biased over-sampled DFT channel estimate and a DCT channel estimate with interference from one cyclic shifted reference signal.
Figure 10B:
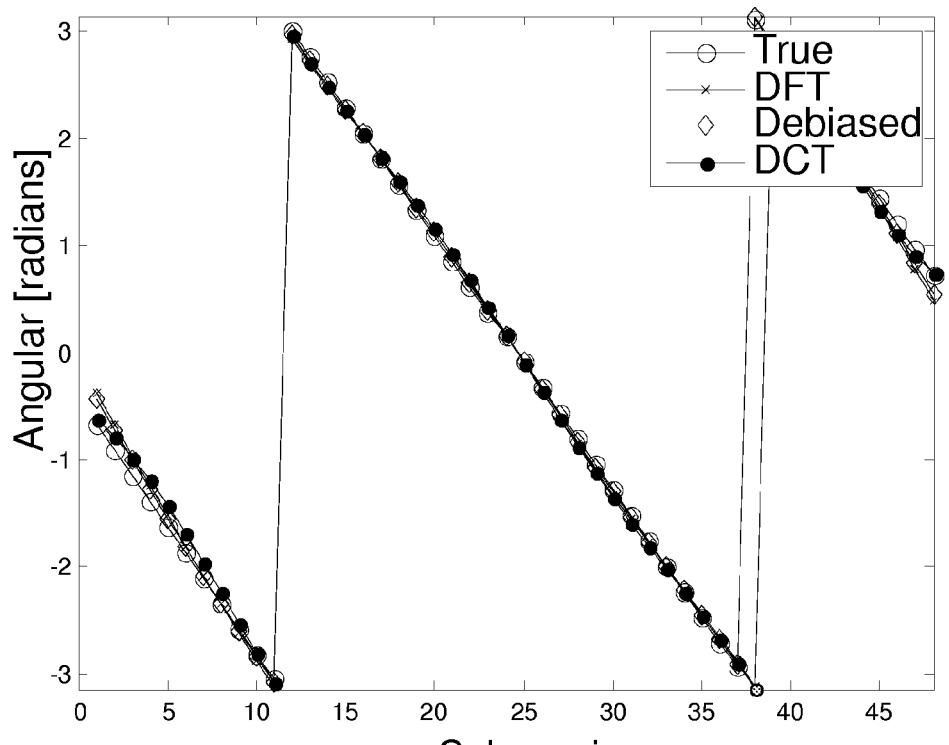

In one example of a time domain windowing, described as step 3 in FIG. 4, the interval from 0 up to 5 microseconds is extracted. In FIG. 9, the interference from the cyclic shifted reference signal is much larger for the DCT based channel estimate than for the over-sampled DFT based channel estimate within this interval, which indicates that the DCT based channel estimate is more distorted by the interfering cyclic shifted reference signals than the over-sampled DFT based channel estimate. This is also illustrated in FIGS. 10a-b, where the channel estimates for the desired user are given together with the true channel for this desired user. The over-sampled DFT based channel estimate is closer to the true channel than the DFT based channel estimate, and is thus preferable as it provides an increased robustness against interference from cyclic shifted reference signals compared to the DCT based channel estimate.

In embodiments of the invention, the problem of the bias in the over-sampled frequency domain channel estimate introduced by the windowing is addressed by a solution where the bias is compensated for in the channel estimate using a digital sinc function.

In one embodiment, the de-biased channel estimate $\hat{H}_{dDFT}(k)$ is based on an over-sampled DFT channel estimate $\hat{H}_{osDFT}(k)$ and equals:

$$\hat{H}_{dDFT}(k) = \frac{\hat{H}_{osDFT}(k)}{B(k)} \tag{15}$$

for sub-carrier index k=0, . . . , $N_c-1$, where the de-biasing values B(k) are defined as:

$$B(k) = \frac{1}{N_c K_{os}} \sum_{k'=0}^{N_c-1} \frac{\sin\left(\frac{\pi(k-k')(m_R - m_L + 1)}{2N_c K_{os}}\right)}{\sin\left(\frac{\pi(k-k')}{N_c K_{os}}\right)} e^{-j\frac{\pi(k-k')(m_R+m_L-2m_0(k))}{N_c K_{os}}} \tag{16}$$

In (16), $N_c$ is the number of sub-carriers, $K_{os}$ is the over-sampling factor which is typically equal to two, $m_R$ is the right channel tap index of the applied window, $m_L$ is the left channel tap index of the applied window, and $m_0(k)$ is the group delay of the channel as a function of sub-carrier index k. The de-biasing values B(k) may in one embodiment be pre-calculated and stored in a memory for a number of values of the parameters included in the definition and listed above.

As already mentioned above, an example of a de-biased channel estimate is illustrated in FIGS. 8a-b. The bias in an over-sampled DFT based channel estimate has thus been compensated for. It may be seen that the de-biased channel estimate is closer to the true channel than both the over-sampled DFT and DCT based channel estimates. The corresponding channel estimates when interfering cyclic shifted reference signals are added are illustrated in FIGS. 10a-b. Also in this case it may be seen that the de-biased channel estimate is closer to the true channel than both the over-sampled DFT based channel estimate and the DCT based channel estimate.

An alternative and implementation friendly way of calculating the de-biasing values is given by:

$$B(k) = \frac{1}{N_c K_{os}} \sum_{m=m_L}^{m_R} \frac{\sin\left(\frac{\pi(m-m_0(k))}{K_{os}}\right)}{\sin\left(\frac{\pi(m-m_0(k))}{N_c K_{os}}\right)} e^{-j\frac{\pi(m-m_0(k))(2k-N_c+1)}{N_c K_{os}}} \tag{17}$$

This formulation is implementation friendly in the sense that it requires less calculations compared to equation (16). Thus if the de-biasing values are not pre-calculated but are calculated each time they are used, then this formulation may be beneficial.

The group delay $m_0(k)$ of the channel is one of the parameters needed to calculate the de-biasing values. This group delay can be estimated using the channel estimates in time or frequency domain.

An approximation of the de-biasing values $\tilde{B}(k)$ may be calculated as:

$$\tilde{B}(k) = \frac{1}{N_c K_{os}} \sum_{k'=0}^{N_c-1} \frac{\sin\left(\frac{2\pi(k-k')L}{2N_c K_{os}}\right)}{\sin\left(\frac{2\pi(k-k')}{2N_c K_{os}}\right)} \tag{18}$$

where the channel length $L=m_R-m_L+1$, and the group delay is assumed to be frequency independent and approximately equal to the center of the adaptive window, i.e.

$$m_0(k) \approx \frac{m_R + m_L}{2}.$$

This approximation is implementation friendly in the sense that it has less parameters, such that the amount of calculated values is less compared to when calculating B(k).

The bias compensation may be derived and explained as follows. The bias for each sub-carrier may be defined as $$B_{osDFT}(k) = \frac{E\{\hat{H}_{osDFT}(k)\}}{H(k)} = \frac{\sum_{k'=0}^{N_c-1} W(k-k')H(k')}{H(k)} \tag{19}$$

where $E\{\hat{H}_{osDFT}(k)\}$ is the expected value of the over-sampled channel estimate. Assuming that the channel has a piecewise constant group delay $m_0(k)$, the channel can be written as:

$$H(k) \approx H_0(k)e^{-j\frac{2\pi k m_0(k)}{N_c K_{os}}} \tag{20}$$

where $H_0(k)$ can be assumed to be piecewise constant. By using equation (20), the bias in (19) can be written as:

$$B_{osDFT}(k) = \frac{1}{H(k)} \sum_{k'=0}^{N_c-1} W(k-k')H(k') \tag{21}$$

$$\approx \frac{1}{H(k)} \sum_{k'=0}^{N_c-1} W(k-k')H_0(k')e^{-j\frac{2\pi m_0(k')k'}{N_c K_{os}}}$$

If it is also assumed that the adaptive time domain window is correct, meaning that the width of the window W(k) corresponds to the amount of frequency variations of the channel, the piecewise constant channel $H_0(k)$ can be moved outside the summation in the equation (21) such that the bias can be written as:

$$B_{osDFT}(k) \approx \frac{H_0(k)}{H(k)} \sum_{k'=0}^{N_c-1} W(k-k')e^{-j\frac{2\pi m_0(k')k'}{N_c K_{os}}} \quad (22)$$

Using equation (20) again results in:

$$B_{osDFT}(k) \approx \frac{H(k)e^{j\frac{2\pi m_0(k)k}{N_c K_{os}}}}{H(k)} \sum_{k'=0}^{N_c-1} W(k-k')e^{-j\frac{2\pi m_0(k')k'}{N_c K_{os}}} \quad (23)$$

$$= \sum_{k'=0}^{N_c-1} W(k-k')e^{j\frac{2\pi(km_0(k)-k'm_0(k'))}{N_c K_{os}}}$$

Using again the assumption of piecewise constant group delay, $m_0(k')$ can be replaced by $m_0(k)$ such that the de-biasing values may be determined as:

$$B_{osDFT}(k) \approx \sum_{k'=0}^{N_c-1} W(k-k')e^{j\frac{2\pi m_0(k)(k-k')}{N_c K_{os}}} \quad (24)$$

Figure 11A:
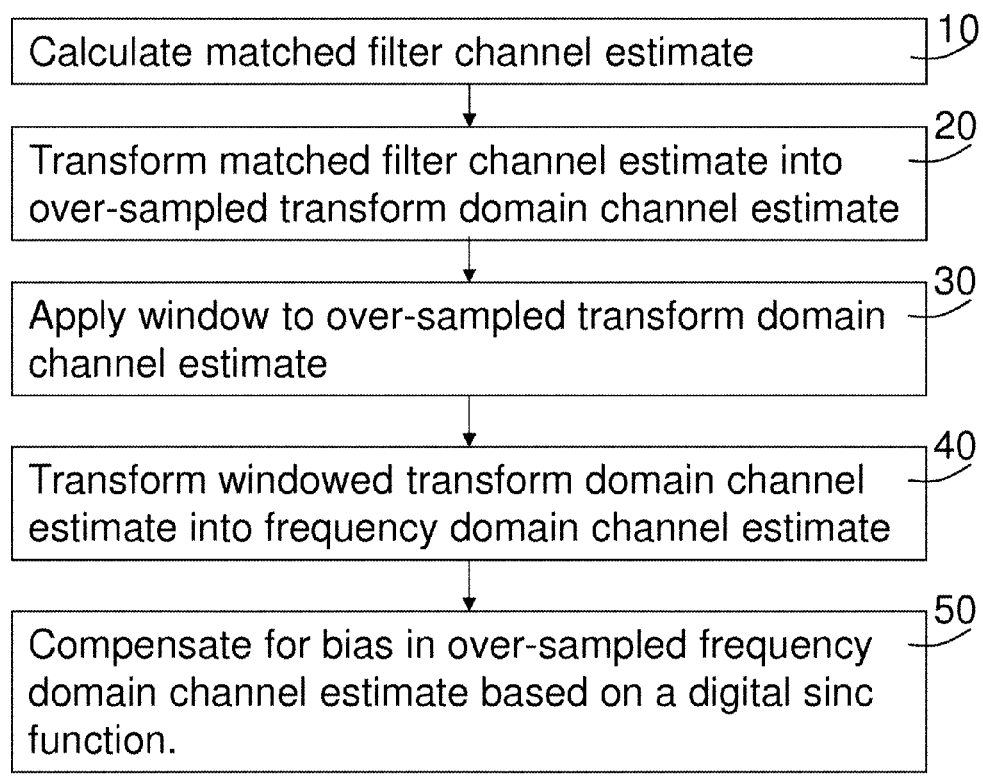
FIGS. 11a-11b are flowcharts of the method performed by the receiving node according to embodiments.

FIG. 11a is a flowchart of the method for determining a channel estimate of a radio channel in a receiving node of a radio communication system, according to embodiments of the invention. The method comprises:

10: Calculating a matched filter channel estimate based on a known reference signal and a received reference signal in a frequency domain.

20: Transforming the matched filter channel estimate into an over-sampled transform domain channel estimate. In one embodiment, the matched filter channel estimate is transformed based on a DFT, and in an alternative embodiment the matched filter channel estimate is transformed based on a DCT.

30: Applying a window to the over-sampled transform domain channel estimate to achieve a windowed transform domain channel estimate. In one embodiment, the window is applied so that a centre of the window substantially coincides with the group delay of the radio channel.

40: Transforming the windowed transform domain channel estimate into a frequency domain channel estimate. In one embodiment, this transform is based on a DFT, and in an alternative embodiment this transform is based on a DCT.

50: Compensating for a bias in the over-sampled frequency domain channel estimate based on a digital sinc function.

Figure 11B:
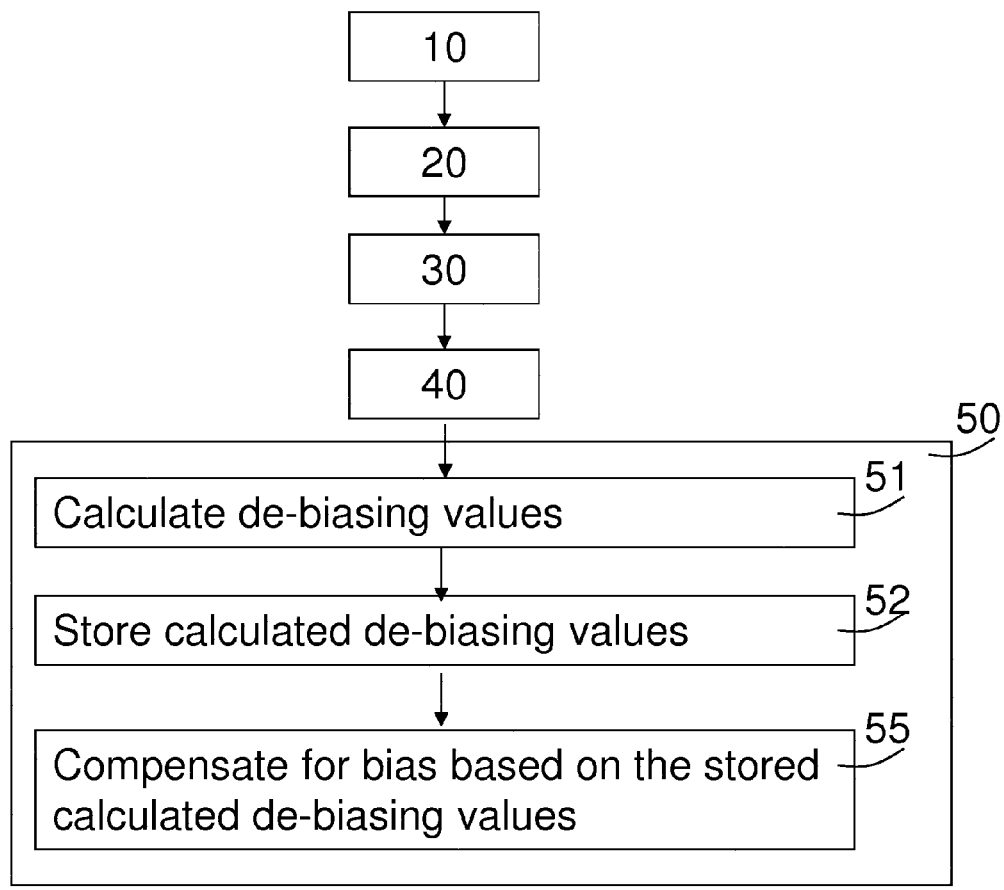

FIG. 11b is a flowchart of the method according to an embodiment. The method comprises steps 10 to 40 as described with reference to FIG. 11a above. However step 50 comprises the following:

51: Calculating de-biasing values based on the digital sinc function and a set of values for at least one of a group delay of the radio channel, an over-sampling factor, a right and a left channel tap index of the applied window, and a number of sub-carriers for which the channel estimate is determined.

52: Storing the calculated de-biasing values.

55: Compensating for the bias in the over-sampled frequency domain channel estimate based on the stored calculated de-biasing values.

In embodiments of the invention, the de-biasing values are calculated based on one of the alternative equations given in (16), (17) and (18) above.

Figure 12A:
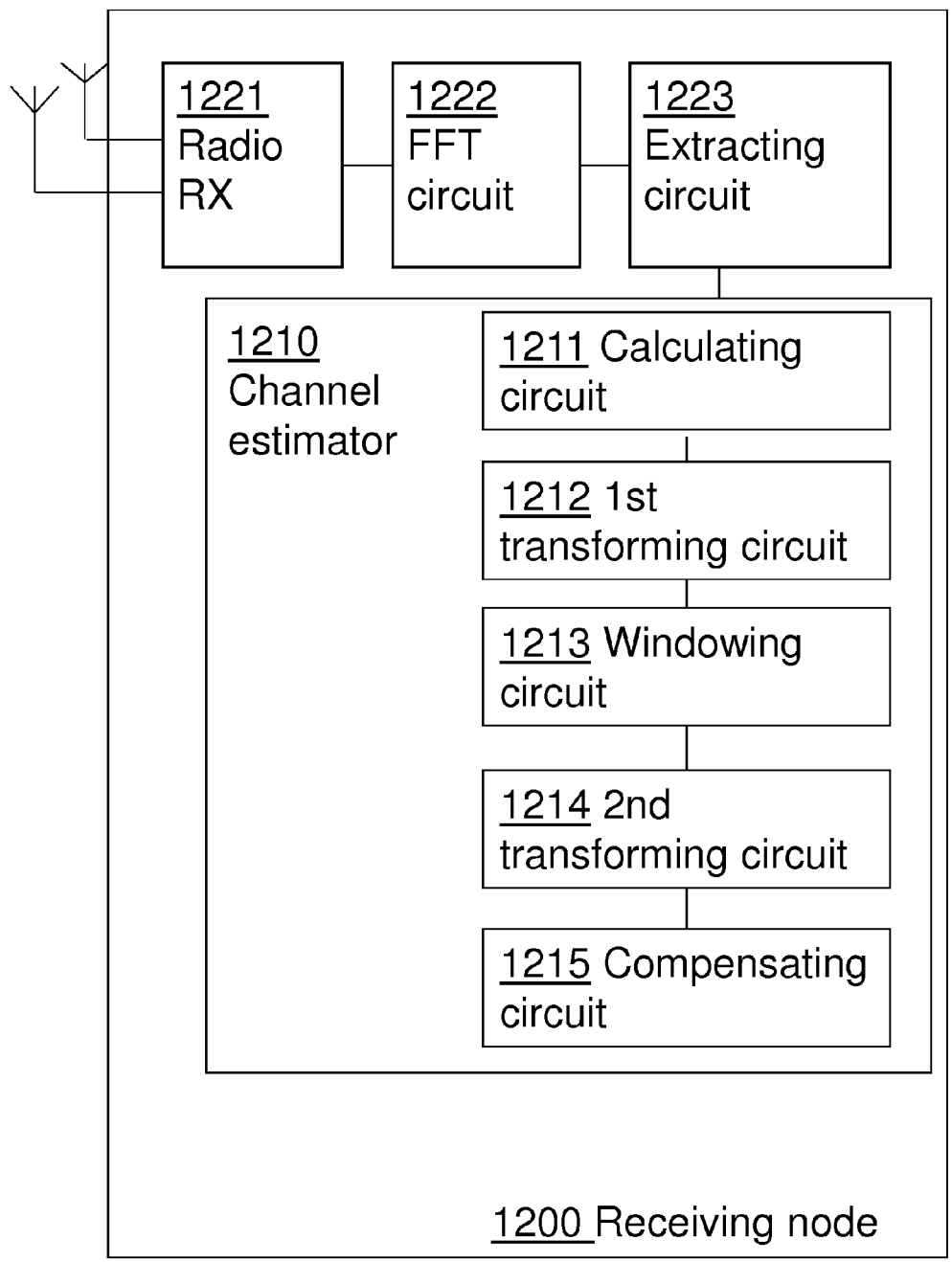
FIGS. 12a-12b illustrate schematically a receiving node according to embodiments.

The receiving node for a radio communication system is schematically illustrated in FIG. 12a, according to embodiments of the present invention. The receiving node 1200 comprises a radio receiver 1221 for receiving a signal transmitted over a radio channel, and an FFT circuit 1222 for transforming the received signal in the time domain to a discrete frequency domain signal. In one example the FFT circuit 1222 may be a DFT converter. As the received signal comprises reference signals from different users, the receiving node 1200 also comprises an extracting circuit 1223 for extracting the parts of the signal corresponding to each user.

The receiving node 1200 further comprises a channel estimator 1210 configured to determine a channel estimate for the radio channel. The channel estimator 1210 comprises a calculating circuit 1211 adapted to calculate a matched filter channel estimate based on a known reference signal and a received reference signal in a frequency domain, a first transforming circuit 1212 adapted to transform the matched filter channel estimate into an over-sampled transform domain channel estimate, a windowing circuit 1213 adapted to apply a window to the over-sampled transform domain channel estimate to achieve a windowed transform domain channel estimate, and a second transforming circuit 1214 adapted to transform the windowed transform domain channel estimate into a frequency domain channel estimate.

The first transforming circuit 1212 is in one embodiment adapted to transform the matched filter channel estimate based on a DFT, and in an alternative embodiment based on a DCT. The windowing circuit 1213 may be further adapted to apply the window so that a center of the window substantially coincides with the group delay of the radio channel. The channel estimator 1210 also comprises a compensating circuit 1215 adapted to compensate for a bias in the over-sampled frequency domain channel estimate based on a digital sinc function.

In one embodiment, the compensating circuit 1215 is adapted to calculate de-biasing values based on the digital sinc function and a set of values for at least one of a group delay of the radio channel, an over-sampling factor, a right and a left position of the applied window, and a number of sub-carriers for which the channel estimate is determined, and to compensate for the bias in the over-sampled frequency domain channel estimate based on the calculated de-biasing values.

The compensating circuit 1215 may also be further adapted to store the calculated de-biasing values in e.g. a memory in the receiving node 1200, and to compensate for the bias based on the stored calculated de-biasing values. In embodiments of the invention, the compensating circuit 1215 is adapted to calculate the de-biasing values based on one of the alternative equations given in (16), (17) and (18) above.

The circuits described above with reference to FIG. 12a are logical circuits and do not necessarily correspond to separate physical circuits.

Figure 12B:
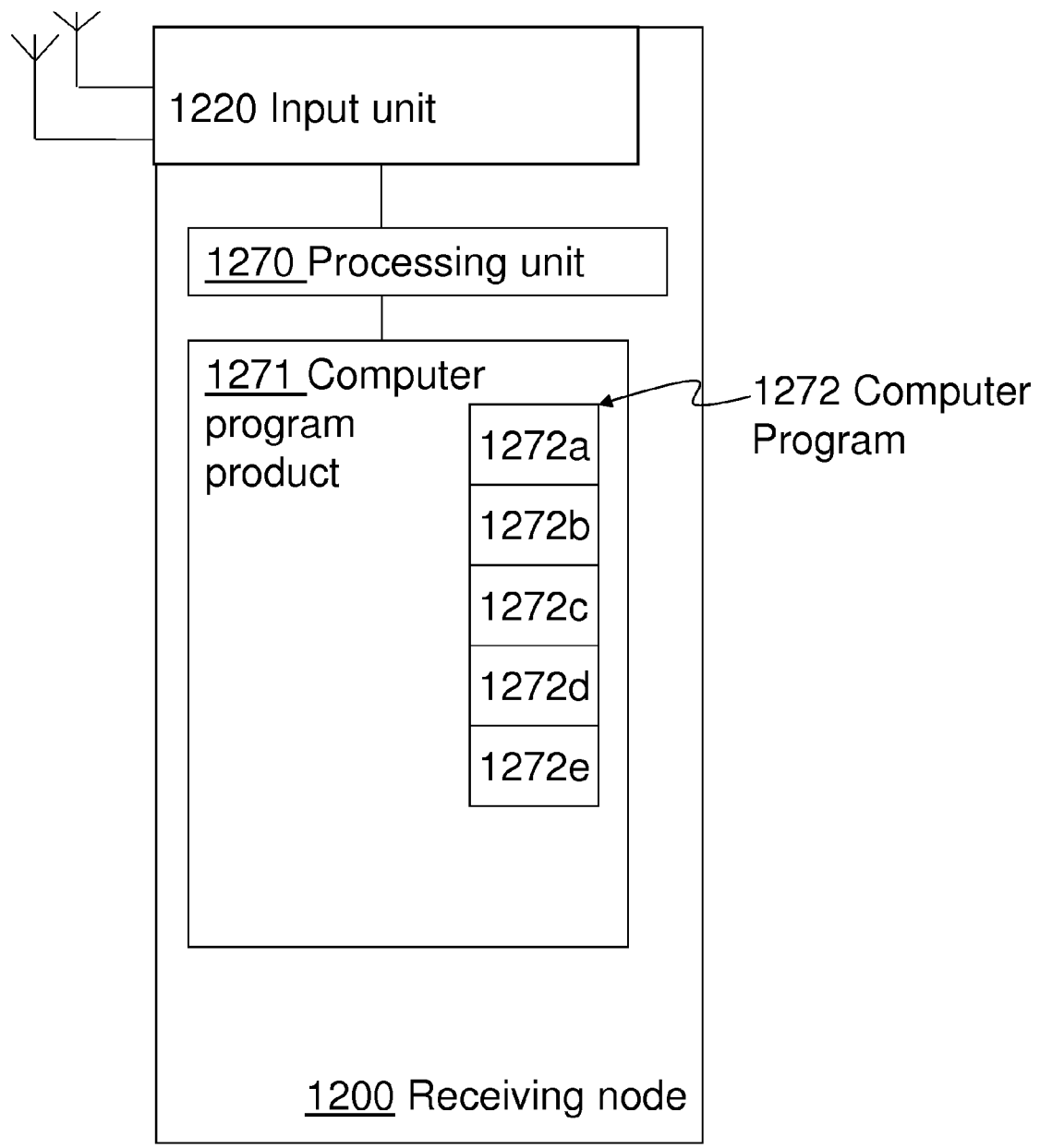

FIG. 12b schematically illustrates an embodiment of the receiving node 1200, which is an alternative way of disclosing the embodiment illustrated in FIG. 12a. The receiving node 1200 comprises an input unit 1220 which is adapted to receive a signal transmitted over a radio channel, to transform the received signal in the time domain to a discrete frequency domain signal, and to extract the parts of the signal corresponding to each user. The input unit 1220 thus corresponds to circuits 1221, 1222 and 1223 described above.

The input unit 1220 may be integrated in hardware of the receiving node 1200. The receiving node 1200 also comprises a processing unit 1270 which may be a single unit or a plurality of units. Furthermore, the receiving node 1200 comprises at least one computer program product 1271 with a computer readable medium in the form of a non-volatile memory, e.g. an EEPROM (Electrically Erasable Programmable Read-Only Memory), a flash memory or a disk drive.

The computer program product 1271 also comprises a computer program 1272 stored on the non-transitory computer readable medium, which comprises code means—computer program instructions—which when run on processing circuitry of the receiving node 1200 causes the processing unit 1270 on the receiving node 1200 to perform the steps of the procedures described earlier in conjunction with FIGS. 11*a-b*.

Hence in the embodiments described, the code means in the computer program 1272 of the receiving node 1200 comprises a calculating module 1272*a* for calculating a matched filter channel estimate based on a known reference signal and a received reference signal in a frequency domain, a first transforming module 1272*b* for transforming the matched filter channel estimate into an over-sampled transform domain channel estimate, a windowing module 1272*c* for applying a window to the over-sampled transform domain channel estimate to achieve a windowed transform domain channel estimate, a second transforming module 1272*d* for transforming the windowed transform domain channel estimate into a frequency domain channel estimate, and a compensating module 1272*e* for compensating for a bias in the over-sampled frequency domain channel estimate based on a digital sinc function.

The code means may thus be implemented as computer program code structured in computer program modules. The modules 1272*a-e* essentially perform the steps of the flow in FIG. 11*a* to emulate the receiving node described in FIG. 12*a*. In other words, when the different modules 1272*a*-1272*e* are run on the processing unit 1270, they correspond to the circuits 2011-2015 in FIG. 12*a*.

Although the code means in the embodiment disclosed above in conjunction with FIG. 12*b* are implemented as computer program modules which when run on the receiving node 1200 causes the node to perform steps described above in conjunction with FIG. 11*a*, one or more of the code means may in alternative embodiments be implemented completely or partly in firmware, hardware or combinations thereof.

The above mentioned and described embodiments are only given as examples and should not be limiting to the present invention.

ABBREVIATIONS

3GPP 3rd Generation Partnership Program
ASK Amplitude Shift Keying
CN Core Network
CP Cyclic Prefix
DCT Discrete Cosine Transform
DFT Discrete Fourier Transform
eNB Evolved Node B
E-UTRAN Evolved UTRAN
FFT Fast Fourier Transform
GSM Global System for Mobile communication
IDFT Inverse DFT
IFFT Inverse FFT
LTE Long Term Evolution
MU-MIMO Multi-User Multiple Input Multiple Output
OFDM Orthogonal Frequency Division Multiplexing
OFDMA Orthogonal Frequency Division Multiple Access
PSK Phase Shift Keying
QAM Quadrature Amplitude Modulation
QPSK Quadrature PSK
RAN Radio Access Network
RBS Radio Base Station
SC-FDMA Single Carrier-Frequency Division Multiple Access
UE User Equipment
UMTS Universal Mobile Telecommunications System
UTRAN Universal Terrestrial RAN

What is claimed is:

1. A method for determining a channel estimate of a radio channel in a receiving node of a radio communication system, the method comprising:
    calculating a matched filter channel estimate based on a known reference signal and a received reference signal in a frequency domain;
    transforming the matched filter channel estimate into an over-sampled transform domain channel estimate;
    applying a window to the over-sampled transform domain channel estimate to achieve a windowed transform domain channel estimate;
    transforming the windowed transform domain channel estimate into a frequency domain channel estimate, the frequency domain channel estimate corresponding to a number of sub-carriers; and
    compensating for a bias in the over-sampled frequency domain channel estimate by applying de-biasing values that are calculated based on a digital sinc function, wherein for each individual sub-carrier, a corresponding de-biasing value is calculated and applied individually for that sub-carrier.

2. The method according to claim 1, wherein the compensating for the bias comprises:
    calculating the de-biasing values based on the digital sinc function and a set of values for at least one of a group delay of the radio channel, an over-sampling factor, a right and a left channel tap index of the applied window, and the number of sub-carriers for which the channel estimate is determined; and
    compensating for the bias in the over-sampled frequency domain channel estimate based on the calculated de-biasing values.

3. The method according to claim 2, wherein the compensating for the bias further comprises:
    storing the calculated de-biasing values; and
    wherein the compensation for the bias is based on the stored calculated de-biasing values.

4. The method according to claim 2, wherein the window is applied so that a center of the window substantially coincides with the group delay of the radio channel.

5. The method according to claim 1, wherein the matched filter channel estimate is transformed based on a Discrete Fourier Transform, DFT.

6. The method according to claim 1, wherein the matched filter channel estimate is transformed based on a Discrete Cosine Transform, DCT.

7. The method according to claim 2, wherein the de-biasing values, denoted as B(k), are calculated based on the following equation:

$$B(k) = \frac{1}{N_c K_{os}} \sum_{k'=0}^{N_c-1} \frac{\sin\left(\frac{\pi(k-k')(m_R - m_L + 1)}{N_c K_{os}}\right)}{\sin\left(\frac{\pi(k-k')}{N_c K_{os}}\right)} e^{-j\frac{\pi(k-k')(m_R + m_L - 2m_0(k))}{N_c K_{os}}}$$

wherein k and k' are sub-carrier indices, $N_c$ is the number of sub-carriers for which the channel estimate is determined, $K_{os}$ is the over-sampling factor, $m_R$ is the right channel tap index of the applied window, $m_L$ is the left channel tap index of the applied window, and $m_0(k)$ is the group delay of the radio channel as function of sub-carrier index k.

8. The method according to claim 2, wherein the de-biasing values, denoted as B(k), are calculated based on the following equation:

$$B(k) = \frac{1}{N_c K_{os}} \sum_{m=m_L}^{m_R} \frac{\sin\left(\frac{\pi(m - m_0(k))}{K_{os}}\right)}{\sin\left(\frac{\pi(m - m_0(k))}{N_c K_{os}}\right)} e^{-j\frac{\pi(m - m_0(k))(2k - N + 1)}{N_c K_{os}}}$$

wherein k and k' are sub-carrier indices, $N_c$ is the number of sub-carriers for which the channel estimate is determined, $K_{os}$ is the over-sampling factor, m is a channel tap index, $m_R$ is the right channel tap index of the applied window, $m_L$ is the left channel tap index of the applied window, and $m_0(k)$ is the group delay of the radio channel as function of sub-carrier index k.

9. The method according to claim 2, wherein the de-biasing values, denoted as B(k), are calculated based on the following equation:

$$B(k) = \frac{1}{N_c K_{os}} \sum_{k'=0}^{N_c-1} \frac{\sin\left(\frac{2\pi(k-k')L}{2N_c K_{os}}\right)}{\sin\left(\frac{2\pi(k-k')}{2N_c K_{os}}\right)}$$

wherein k and k' are sub-carrier indices, $N_c$ is the number of sub-carriers for which the channel estimate is determined, $K_{os}$ is the over-sampling factor, and L is the length of the applied window in number of channel taps.

10. A receiving node for a radio communication system, comprising a channel estimator configured to determine a channel estimate of a radio channel, the channel estimator comprising:

a calculating circuit adapted to calculate a matched filter channel estimate based on a known reference signal and a received reference signal in a frequency domain;

a first transforming circuit adapted to transform the matched filter channel estimate into an over-sampled transform domain channel estimate;

a windowing circuit adapted to apply a window to the over-sampled transform domain channel estimate to achieve a windowed transform domain channel estimate;

a second transforming circuit adapted to transform the windowed transform domain channel estimate into a frequency domain channel estimate, the frequency domain channel estimate corresponding to a number of sub-carriers; and a compensating circuit adapted to compensate for a bias in the over-sampled frequency domain channel estimate by applying de-biasing values that are calculated based on a digital sinc function, wherein for each individual sub-carrier, a corresponding de-biasing value is calculated and applied individually for that sub-carrier.

11. The receiving node according to claim 10, wherein the compensating circuit is adapted to:

calculate the de-biasing values based on the digital sinc function and a set of values for at least one of a group delay of the radio channel, an over-sampling factor, a right and a left position of the applied window, and the number of sub-carriers for which the channel estimate is determined; and compensate for the bias in the over-sampled frequency domain channel estimate based on the calculated de-biasing values.

12. The receiving node according to claim 11, wherein the compensating circuit is further adapted to store the calculated de-biasing values, and to compensate for the bias based on the stored calculated de-biasing values.

13. The receiving node according to claim 11, wherein the windowing circuit is further adapted to apply the window so that a center of the window substantially coincides with the group delay of the radio channel.

14. The receiving node according to claim 10, wherein the first transforming circuit is adapted to transform the matched filter channel estimate based on a Discrete Fourier Transform, DFT.

15. The receiving node according to claim 10, wherein the first transforming circuit is adapted to transform the matched filter channel estimate based on a Discrete Cosine Transform, DCT.

16. The receiving node according to claim 11, wherein the compensating circuit is adapted to calculate the de-biasing values, denoted as B(k), based on the following equation:

$$B(k) = \frac{1}{N_c K_{os}} \sum_{k'=0}^{N_c-1} \frac{\sin\left(\frac{\pi(k-k')(m_R - m_L + 1)}{N_c K_{os}}\right)}{\sin\left(\frac{\pi(k-k')}{N_c K_{os}}\right)} e^{-j\frac{\pi(k-k')(m_R + m_L - 2m_0(k))}{N_c K_{os}}}$$

wherein k and k' are sub-carrier indices, $N_c$ is the number of sub-carriers for which the channel estimate is determined, $K_{os}$ is the over-sampling factor, $m_R$ is the right channel tap index of the applied window, $m_L$ is the left channel tap index of the applied window, and $m_0(k)$ is the group delay of the radio channel as function of sub-carrier index k.

17. The receiving node according to claim 11, wherein the compensating circuit is adapted to calculate the de-biasing values, denoted as B(k), based on the following equation:

$$B(k) = \frac{1}{N_c K_{os}} \sum_{m=m_L}^{m_R} \frac{\sin\left(\frac{\pi(m - m_0(k))}{K_{os}}\right)}{\sin\left(\frac{\pi(m - m_0(k))}{N_c K_{os}}\right)} e^{-j\frac{\pi(m - m_0(k))(2k - N_c + 1)}{N_c K_{os}}}$$

wherein k and k' are sub-carrier indices, $N_c$ is the number of sub-carriers for which the channel estimate is determined, $K_{os}$ is the over-sampling factor, m is a channel tap index, $m_R$ is the right channel tap index of the applied window, $m_L$ is the left channel tap index of the applied window, and $m_0(k)$ is the group delay of the radio channel as function of sub-carrier index k.

18. The receiving node according to claim 11, wherein the compensating circuit is adapted to calculate the de-biasing values, denoted as B(k), based on the following equation:

$$B(k) = \frac{1}{N_c K_{os}} \sum_{k'=0}^{N_c-1} \frac{\sin\left(\frac{2\pi(k-k')L}{2N_c K_{os}}\right)}{\sin\left(\frac{2\pi(k-k')}{2N_c K_{os}}\right)}$$

wherein k and k' are sub-carrier indices, $N_c$ is the number of sub-carriers for which the channel estimate is determined, $K_{os}$ is the over-sampling factor, and L is the length of the applied window in number of channel taps.

19. A non-transitory computer-readable medium storing a computer program comprising computer readable code that, when executed by processing circuitry at a receiving node of a radio communication system, configures the receiving node to determine a channel estimate of a radio channel, said computer readable code including program instructions causing the receiving node to:

calculate a matched filter channel estimate based on a known reference signal and a received reference signal in a frequency domain;

transform the matched filter channel estimate into an over-sampled transform domain channel estimate;

apply a window to the over-sampled transform domain channel estimate to achieve a windowed transform domain channel estimate;

transform the windowed transform domain channel estimate into a frequency domain channel estimate, the frequency domain channel estimate corresponding to a number of sub-carriers; and compensate for a bias in the over-sampled frequency domain channel estimate by applying de-biasing values that are calculated based on a digital sinc function, wherein for each individual sub-carrier, a corresponding de-biasing value is calculated and applied individually for that sub-carrier.

\* \* \* \* \*